US009165329B2

(12) United States Patent
Beechum et al.

(10) Patent No.: US 9,165,329 B2
(45) Date of Patent: Oct. 20, 2015

(54) MULTI LAYER CHAT DETECTION AND CLASSIFICATION (71) Applicant: Disney Enterprises, Inc., Burbank, CA (US)

(72) Inventors: Andrew R. Beechum, Pasadena, CA (US); Vita G. Markman, Los Angeles, CA (US); Amber Stewart, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 369 days.

(21) Appl. No.: 13/656,599

(22) Filed: Oct. 19, 2012

(65) Prior Publication Data

US 2014/0114895 A1 Apr. 24, 2014

(51) Int. Cl.
*G06Q 10/10* (2012.01)
*G06Q 50/00* (2012.01)

(52) U.S. Cl.
CPC .............. *G06Q 50/01* (2013.01); *G06Q 10/107* (2013.01)

(58) Field of Classification Search
CPC ................................................ G06F 17/30902
USPC ........................................... 706/46; 709/206
See application file for complete search history.

(56) References Cited

U.S. PATENT DOCUMENTS

| 5,678,051 | A | 10/1997 | Aoyama |
| 6,139,201 | A | 10/2000 | Carbonell et al. |
| 7,027,974 | B1 | 4/2006 | Busch et al. |
| 8,015,051 | B2 | 9/2011 | Chen et al. |
| 8,606,726 | B2 | 12/2013 | Wurzer |
| 2001/0029455 | A1 | 10/2001 | Chin et al. |
| 2002/0049805 | A1 | 4/2002 | Yamada et al. |
| 2002/0059379 | A1 | 5/2002 | Harvey et al. |
| 2002/0062349 | A1 | 5/2002 | Maehiro et al. |
| 2002/0140726 | A1 | 10/2002 | Schwartz et al. |
| 2003/0097406 | A1 | 5/2003 | Stafford |
| 2003/0187632 | A1 | 10/2003 | Menich |
| 2004/0102957 | A1 | 5/2004 | Levin |
| 2004/0111479 | A1* | 6/2004 | Borden et al. ............... 709/206 |
| 2005/0038650 | A1 | 2/2005 | Bellegarda et al. |
| 2005/0076247 | A1 | 4/2005 | Wittkotter |

(Continued)

FOREIGN PATENT DOCUMENTS

| WO | 02070088 A1 | 9/2002 |
| WO | 2004/001558 A2 | 12/2003 |
| WO | 2008109680 A1 | 9/2008 |

OTHER PUBLICATIONS

European Search Report for application No. 13189585.6; Dec. 12, 2013.

(Continued)

*Primary Examiner* — Jeffrey A Gaffin
*Assistant Examiner* — Ola Olude Afolabi
(74) *Attorney, Agent, or Firm* — Patterson & Sheridan, LLP (57) ABSTRACT Embodiments presented herein provide systems, methods and articles of manufacture for a computer-implemented method to monitor users interacting in an online multiuser environment. For each message sent by a user during a session, determining, via a first classifier, whether the message is either acceptable or unacceptable for the online multiuser environment. Upon satisfying a triggering condition for the session of the user, determining, via a second classifier, whether to escalate the session to a moderator for review.

18 Claims, 10 Drawing Sheets

(56) References Cited

U.S. PATENT DOCUMENTS

| | | |
|---|---|---|
| 2005/0137851 A1 | 6/2005 | Ryu et al. |
| 2005/0154580 A1 | 7/2005 | Horowitz et al. |
| 2005/0203747 A1 | 9/2005 | Lecoeuche |
| 2005/0240439 A1 | 10/2005 | Covit et al. |
| 2005/0278413 A1 | 12/2005 | Tannenbaum |
| 2005/0288931 A1 | 12/2005 | Kaneko et al. |
| 2006/0003838 A1 | 1/2006 | Kobayashi et al. |
| 2006/0129633 A1 | 6/2006 | Potluri et al. |
| 2007/0016401 A1 | 1/2007 | Ehsani et al. |
| 2007/0118357 A1 | 5/2007 | Kasravi et al. |
| 2007/0150426 A1 | 6/2007 | Asher et al. |
| 2007/0168511 A1 | 7/2007 | Brochu et al. |
| 2008/0071521 A1 | 3/2008 | Larvet |
| 2008/0168095 A1* | 7/2008 | Larcombe et al. ......... 707/104.1 |
| 2008/0195571 A1 | 8/2008 | Furuuchi et al. |
| 2008/0215519 A1 | 9/2008 | Runge et al. |
| 2008/0221998 A1 | 9/2008 | Mendelsohn et al. |
| 2008/0288241 A1 | 11/2008 | Noda |
| 2009/0132528 A1 | 5/2009 | Albornoz et al. |
| 2009/0210803 A1 | 8/2009 | Brignull et al. |
| 2009/0245500 A1 | 10/2009 | Wampler |
| 2009/0253513 A1 | 10/2009 | Ducheneaut et al. |
| 2009/0271180 A1 | 10/2009 | Balegar et al. |
| 2009/0299960 A1 | 12/2009 | Lineberger |
| 2009/0319915 A1 | 12/2009 | Bates et al. |
| 2010/0010800 A1 | 1/2010 | Rehberg |
| 2010/0050074 A1 | 2/2010 | Nachmani et al. |
| 2010/0057463 A1 | 3/2010 | Weng et al. |
| 2010/0169769 A1 | 7/2010 | Jimenez et al. |
| 2011/0092221 A1 | 4/2011 | Zubas et al. |
| 2011/0154224 A1 | 6/2011 | Bates et al. |
| 2011/0184718 A1 | 7/2011 | Chen |
| 2011/0201387 A1 | 8/2011 | Paek et al. |
| 2011/0270771 A1 | 11/2011 | Coursimault et al. |
| 2011/0270820 A1 | 11/2011 | Agarwal |
| 2012/0036147 A1 | 2/2012 | Borst et al. |
| 2012/0054645 A1 | 3/2012 | Hoomani et al. |
| 2012/0072404 A1 | 3/2012 | Murphy et al. |
| 2012/0101970 A1 | 4/2012 | Zernik et al. |
| 2012/0191445 A1 | 7/2012 | Markman et al. |
| 2012/0323565 A1 | 12/2012 | Hildreth et al. |
| 2013/0046791 A1 | 2/2013 | Markman et al. |
| 2013/0047099 A1 | 2/2013 | Markman et al. |
| 2014/0114895 A1 | 4/2014 | Beechum et al. |

OTHER PUBLICATIONS

Method for Chat Spam Prevention in a Virtual World, Oct. 31, 2008, IP.com.

Max Kaufmann: "Syntactic Normalization of Twitter Messages", The 8-th International Conference on Natural Language Processing, Jan. 1, 2010.

Park et al. "Communication Supports for Building World Wide Internet Game Communities". Entertainment Computing-ICEC 2006, pp. 370-373.

Boehret, Katherin; "The Mossberg Solution: Rating the New Instant-Messaging Programs"; Feb. 7, 2007; Wall Street Journal; Eastern edition; New York, N.Y. (0099-9660). P.D.1.

Mine et al. "Building a massively Multiplayer Game for the Million: Disney's Toontown Online". Computers in Entertainment (CIE) 1.1, Oct. 2003, pp. 1-20.

Ghayoomi M et al: "An overview on the existing language models for prediction systems as writing assistant tools", Systems, Man and Cybernetics, 2009. SMC 2009. IEEE International Conference on, IEEE, Piscataway, NJ, USA, Oct. 11, 2009, pp. 5883-5887.

Hunnicutt S Ed—Tubach J P et al: "Using Syntactic and Semantic Information in a Word Prediction Aid", Proceedings of the European Conference on Speech Communication and Technology (Eurospeech). Paris, Sept. 26-28, 1989; [Proceedings of the European Conference on Speech Communication and Technology (Eurospeech)], Edinburgh, CEP Consultants, GB, vol. 1, Sep. 26, 1989, pp. 191-193.

* cited by examiner

MULTI LAYER CHAT DETECTION AND CLASSIFICATION

BACKGROUND

1. Field of the Invention

The present invention generally relates to efficiently classifying chat as acceptable or unacceptable to protect the safety of guests in an online environment.

2. Description of the Related Art

Online chat may refer to any kind of communication over the Internet which offers a real-time direct transmission of text-based messages from sender to receiver. Online chat may be a point-to-point or a multicast communication from one sender to one or more receivers. Chat may be a feature of an online community, a forum, a Web conferencing service, or any of a variety of other online text based communications.

Many online communities have rules or guidelines to avoid misunderstandings and to simplify the communication between users in a chat session. These guidelines vary from community to community. Hopefully, such guidelines protect the communities and their guests from bullying, lewd behavior, harassment, violence, and a host of other unwanted or inappropriate activities. Most chat communities monitor online chat to ensure compliance with the guidelines. Moderators are tasked with monitoring chat to determine the context of particular chat messages to ascertain whether a user has violated the community guidelines. It is both impractical and expensive for monitors to directly monitor all chat communication due to the amount of chat in most online communities.

Software is often used to filter chat which may be offensive and that may require further scrutiny by a moderator. The software filter most commonly deployed to monitor chat is a Bayesian filter. Bayesian filters work by using straight matching of human created dictionary of tokens to calculate the probability of chat being inappropriate and flagged for further examination by the moderator. These tokens are typically words, phrases or other classifiers. This has the advantage of being easy to predict and easy to manage directly, but at the cost of accuracy and efficiency. The filter is unable to distinguish between benign uses of certain terms or phrases and other more inappropriate uses of those same terms or phrases. Since many phrases have multiple or hidden meanings, the filter conservatively passes those chat messages over to the moderator. In all probability at some point in time during a chat session, most users will say something which will trigger a chat filter to tag a chat message and notify the moderator of the activity. Coupled with the number of false positive statements from the chat filters, moderators are quickly overwhelmed with requests to review chat sessions.

Chat moderators are required to determine the intention for many lines of chat associated with a particular guests chat session. Typically this involves reading a good portion of the history for the chat session. The moderator must determine the intentions of the guest authoring the chat in the session and whether the chat session is "bad and unacceptable" or "bad but acceptable". The moderator must ultimately determine if the chat session which triggered the review should be overlooked or if any action should be taken on the guest account. The entire process relies tremendously on a moderator's intervention. The moderator's intervention places a huge burden on a company's manpower and is costly. Current filtering technology needs to be improved to escalate to the moderator only those chat sessions that are deemed contrary to the community guidelines and unacceptable as opposed to the chat sessions which may have made a small mistake and would otherwise be forgiven.

SUMMARY

Embodiments presented herein include a method for monitoring users interacting in an online multiuser environment. The method may generally include, for each message sent by a first user during the session, determining, via a first classifier, whether to label the message as being either acceptable or unacceptable for the online multiuser environment. Upon satisfying a triggering condition for the session of the user, a second classifier determines whether to escalate the session to a moderator for review.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for evaluating whether to escalate a chat session to a moderator of a chat community. Chat sessions may be classified using multiple classifiers. In one embodiment the first level classifier evaluates individual chat messages. For example, the first classifier may determine whether to rate each individual message in the chat session as being "unacceptable" or "acceptable." Once rated, the chat session may be monitored for whether a triggering condition is satisfied. For example, after a minimum number of chat messages are in the session, the ratio unacceptable to acceptable chat messages may trigger elevation of the chat session to a second classifier. The second classifier evaluates the collection of "unacceptable" messages to determine whether the chat session should be reviewed by a moderator (or, while containing some messages labeled to be "unacceptable" by the first classifier, is a session for which a moderator would be unlikely to take any action after reviewing). The trigger may also be a quantity or total number of inappropriate chat messages, a particularly bad chat message, or other possibilities. This approach reduces the number of sessions that are elevated by the moderator as well as help better identify chat sessions for which some moderator action is warranted.

In one embodiment, the classifiers are Bayesian filters. Bayesian classifiers work by correlating the use of tokens with inappropriate chat. These tokens can be words, bigrams, trigrams, presence or position of capitalization, odd punctuation, mixed characters, or a host of other things. The Bayesian classifiers can be trained to recognize the probability that a chat message is unacceptable due to the amount of recognized inappropriate content present in the chat message. The inappropriate messages can relate to harassment, bullying, violence, grooming, or a variety of other inappropriate behaviors (for both online communication or otherwise).

A Bayesian classifier is trained to recognize what is and what is not appropriate behavior in order for the classifier to be effective. A ratio of good to bad chat is used to provide initial training of the level one classifier. A conditional probability is computed for each feature in the good and bad training set. For example, after the training, the phrase hello may have a 42% probability as being part of an unacceptable chat message. The phrase "up your" may have a 72% probability of being a part of an unacceptable chat message. These probabilities are merely examples and actual probabilities will be dependent on the supplied training datasets.

The level two Bayesian classifier is trained using chat sessions previously reviewed by a moderator. In such a case, the session may be labeled as one that required (or did not require) moderator intervention. Doing so allows a history of chat sessions to provide both positive and negative examples of what should be reviewed by a moderator. In one embodiment, a chat session so labeled is supplied to the level one classifier, which assigns a rating of "acceptable" or "unacceptable" to each chat message in the session. The set of chat messages labeled as "unacceptable" provides a positive or negative training example (depending on whether the moderator took action after reviewing a given session). Note, the use of only chat messages rated as "unacceptable" in training the second classifier provides a measure of how bad or inappropriate a chat is while not creating an unnecessary bias. That is, while all reviewed chat sessions may include some messages labeled as "unacceptable," not all were acted on by a moderator. By using only the "unacceptable" messages, in a given chat session, the level two classifier may be trained to determine how "bad" a chat session needs to be before moderator intervention is required. Once trained, the level two classifier may evaluate a chat session as one that requires escalation to a moderator or one that does not require moderator review.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., chat communities) or related data available in the cloud. For example, the chat classification engine could execute on a computing system in the cloud and provide the multilayer detection and classification of the chat. In such a case, the chat classification engine could classify user chat messages and store the classified chat session at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
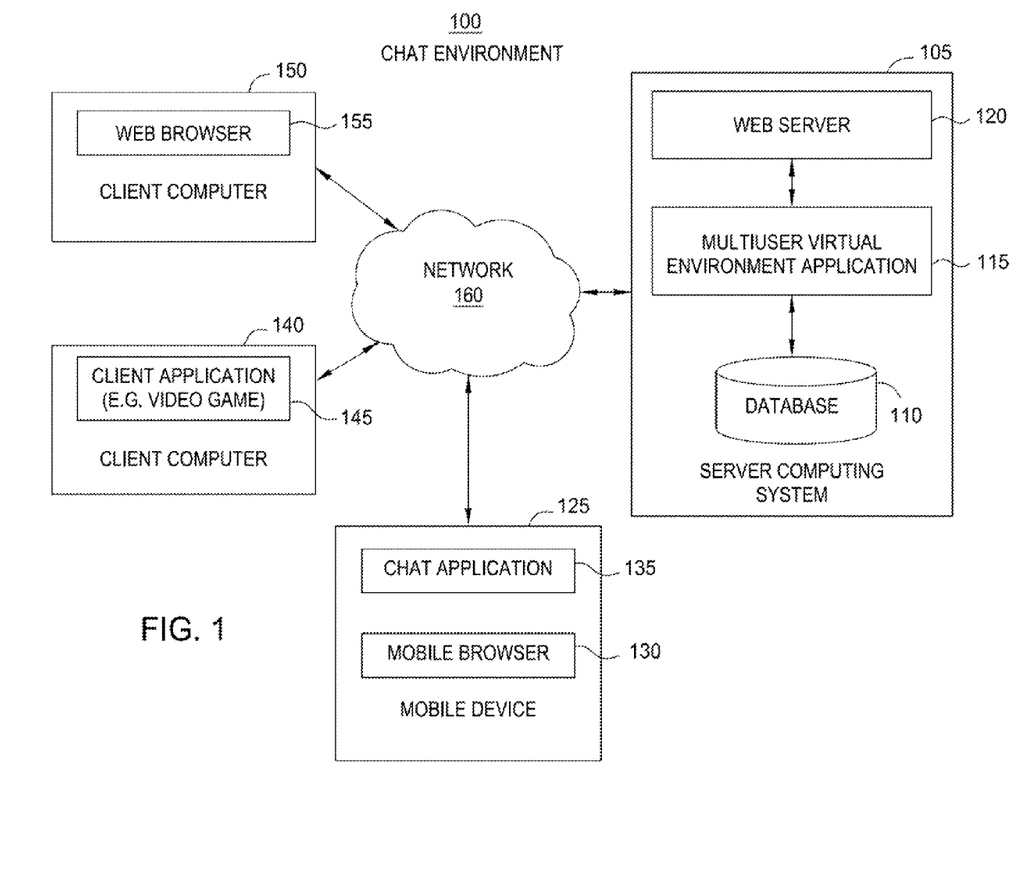
FIG. 1 illustrates an example of a chat environment, according to certain embodiments of the present disclosure.

FIG. 1 illustrates an example of an interactive online environment, according to one embodiment of the invention. As shown, the chat environment 100 includes a network 160, which connects a server computing system 105, a client computer 140 and 150, and a mobile device 125. The server computing system 105 has a web-server 120, a multiuser environment application 115 and a database 110. The client computer 150 has a web-browser 155, and the client computer 140 has a client application such as a video game 145. The mobile device 125 has both a chat application 135 and a mobile browser 130.

As shown, the client computer 150 communicates over a network 160, such as the internet, in a chat session via a web browser 155. The chat session is part of a multiuser environment application 115 attached to a database 110 and hosted by a web server 120 on the server computing system 105. As also shown in FIG. 1, a client computer 140 executes a client application such as a video game 145 to participate in the multiuser environment application 115, hosted on the server computing system 105. In yet another example, mobile device 125 may use a chat application 135 or a mobile browser 130 to participate in a chat session hosted on the server computing system 105. The chat environment 100 is chosen to be a small representative example of the variety of possible chat environments by which users participate in chat communities. The chat environment 100 and a multilayer chat detection and classification can operate on tablets, or other devices.

Figure 2:
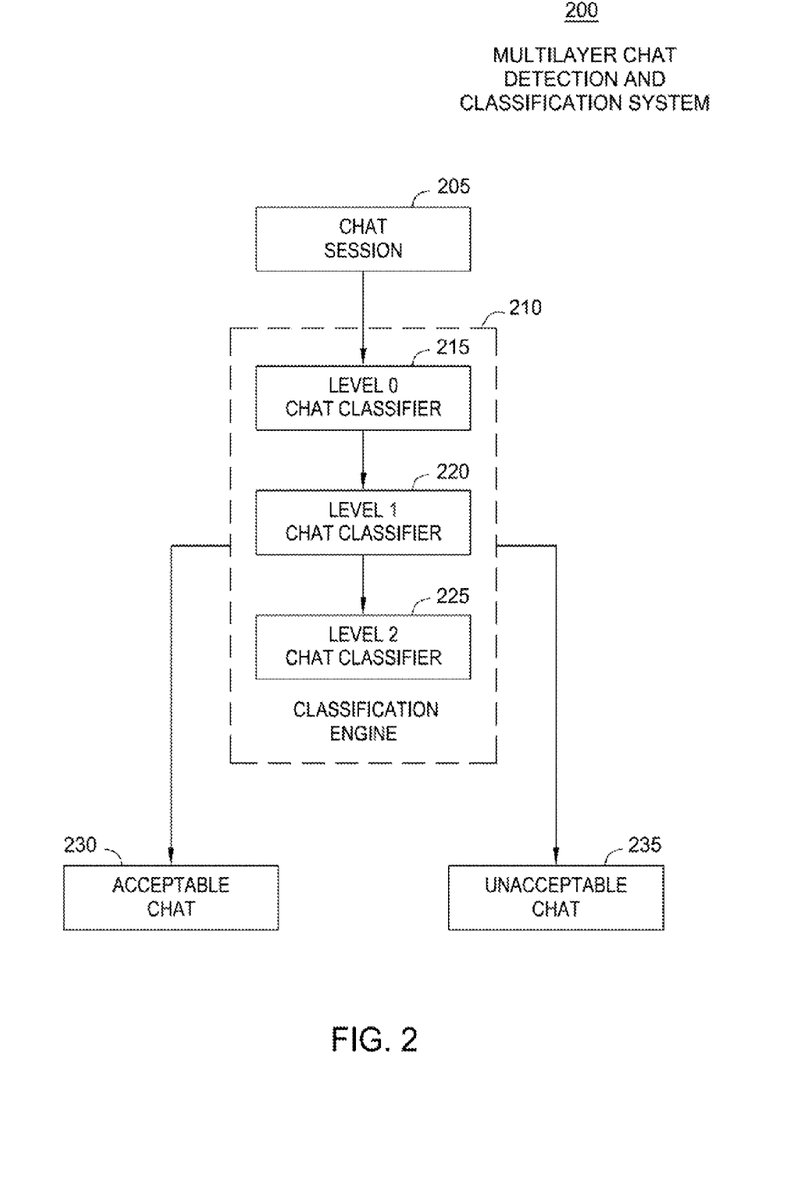
FIG. 2 illustrates an example overview of a multilevel chat detection and classification system, according to certain embodiments of the present disclosure.

FIG. 2 illustrates an example classification engine 210 for a Multilayer Chat Detection and Classification system 200, according to one embodiment of the invention. The classification engine 210 has a level zero chat classifier 215, a level one chat classifier 220 (or more simply, first classifier), and a level two chat classifier 225 (or second classifier). In one embodiment, the first classifier 220 and the second classifier 225 are Bayesian filters. The classification engine 210 receives chat messages 205 and the first classifier 220 determines whether to label the individual chat messages as acceptable chat 230 or unacceptable chat 235. And the second classifier 225 determines whether the chat session should be elevated to a moderator for further review.

The level zero chat classifier 215 determines if the incoming chat 205, entering the classification engine 210, contains certain blacklist items. A blacklist item causes the zero level chat classifier 215 to escalate the unacceptable chat 235 to a moderator. Chat messages which do not contain keywords on the blacklist are routed to be classified through the level one chat classifier 220 Chat messages labeled acceptable by the level one chat classifier 220 is output as acceptable chat 230. Chat found unacceptable by the level one chat classifier 220 is output as unacceptable chat 235. Upon a trigger event, a chat session is directed to the level two chat classifier 225. The level two chat classifier 225 determines if the chat session containing the chat messages classified by the level one chat classifier 220 should be escalated to a moderator. That is, the level one classifier 220 looks for elements of the chat message to determine the probability of a "bad" chat message. Upon reaching a threshold, the level two classifier 225 determines the probability of that chat session, or more specifically, the chat messages in that session classified as unacceptable by the level one classifier 220 as being a chat session that should be reviewed by a moderator.

Figure 3:
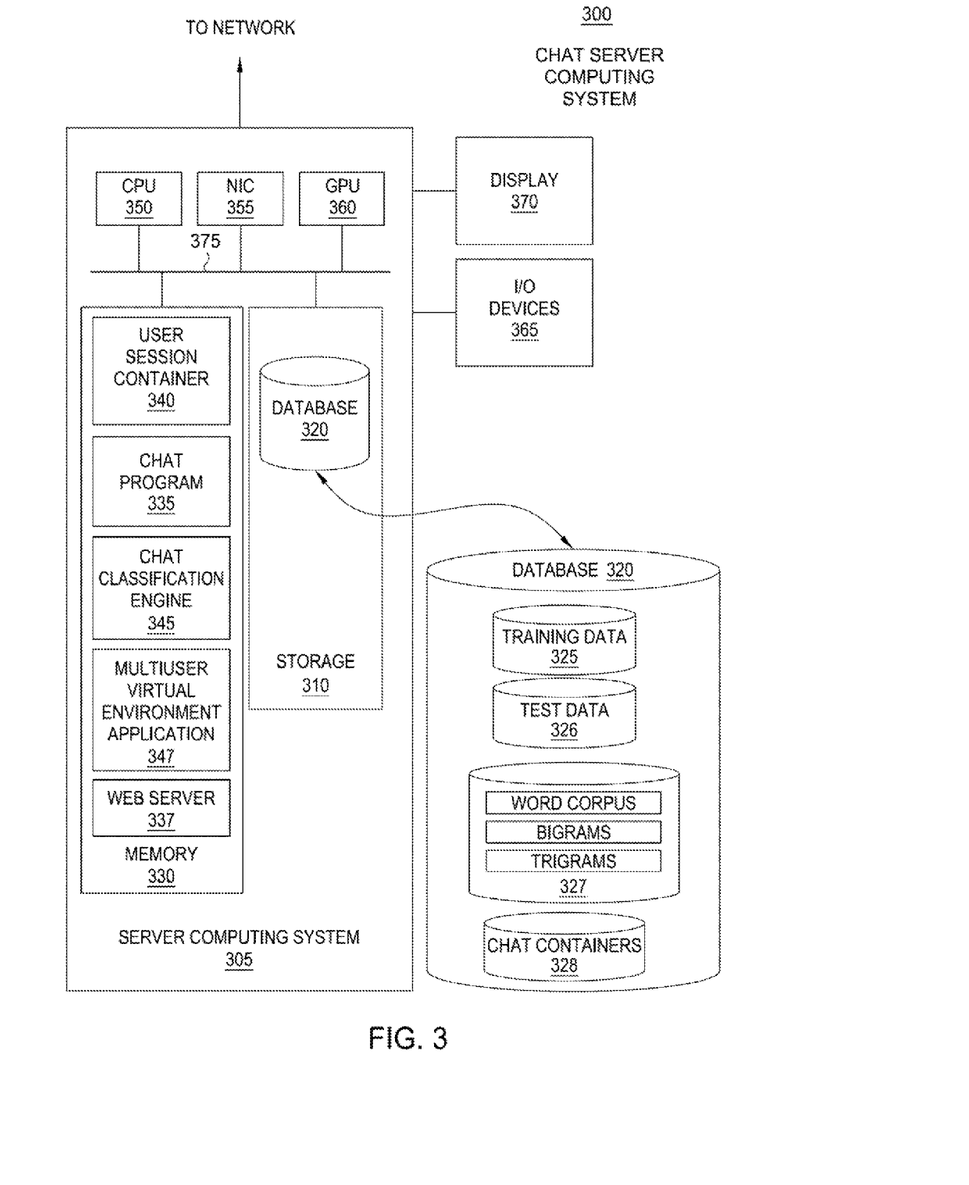
FIG. 3 illustrates an example of a chat server computing system, according to certain embodiments of the present disclosure.

FIG. 3 illustrates an example of a chat server computing system 300, according to one embodiment. As shown, the server computing system 305 includes a CPU (central processing unit) 350, a NIC (network interface card) 355, a GPU (graphical processing unit) 360, memory 330, storage 310, and a bus 375. The server computing system 305 is connected to a display 370, and an input/output (I/O) device 365. The server computing system 305 is included to be representative of a variety of computing systems, including, e.g., tower server, rack mount server, a desktop computer, a laptop computer, a tablet, a console game system, or variety of other computing devices capable of providing chat services to other devices. The chat services may be viewed on the display device 370, e.g., an LCD, LED or CRT monitor and controlled using input devices 365, e.g., a keyboard, mouse and/or a controller.

CPU 350 and GPU 360 are programmable logic devices that execute instructions, logic and mathematical processing, and may be representative of one or more CPUs or GPUs, multi-core CPUs or GPUs, and the like. The memory 330 represents any memory sufficiently large enough to hold a Multiuser Virtual Environment Application 347, a chat program 335, a web server 337, a chat classification engine 345 and a plurality of user session containers 340. The chat classification engine 345 is the same chat classification engine 210 as shown in FIG. 2. The web server 337 is the same the web server 110 as shown in FIG. 1. Memory 330 could be one or a combination of memory devices, including Random Access Memory (e.g., DRAM modules), nonvolatile or backup memory (e.g., programmable or Flash memories, read-only memories, etc.).

Storage 310 stores application programs and a database 320 for use by the chat classification engine 345. Storage 310 is included to be representative of hard-disk drives, solid-state drives (SSD), flash memory devices, optical media (e.g., CD/DVD/Blu-Ray® discs) and the like. The storage device may be internal to the computing device 305 or external such as a NAS, SAN, cloud or other storage environment. As shown, the database 320 includes training data 325, test data 326, chat containers 328, and a corpus of words, labeled as bigrams and trigrams 327

In one embodiment, a user is participating in a Multiuser Virtual Environment Application 347. Multi-user virtual environments (MUVE) 347 are a popular form of multimedia-based entertainment and can be found not only in online games, but user forums and also in support of learning. The MUVE 347 is typically some sort of virtual world. People create a user identity that they can use when they log into the server. The MUVE 347 can be targeted to demographic groups, particular interests, or can even be non-specific. The MUVE Application 347 offers chat services to guests via a chat program 335. For example, a user may initiate a chat session by typing into the chat interface of the MUVE Application 347. In the chat session, people exchange messages. Most of the time, the messages are appropriate. However, sometimes the chat is inappropriate. For example, in some cases people will be mean. But in others case, more serious or troubling messages may be sent. The more serious or troubling messages are the messages the classifiers are configured to escalate. The chat program 335 directs an entered chat message to a user session container 340 which is picked up by the chat classification engine 345. The chat classification engine 345 classifies the chat session through a hierarchy of chat classifiers to determine if the chat sessions of the user session container 340 should be escalated to the moderator. For the chat sessions escalated by the level two chat classifier, the moderator determines if the chat session is acceptable or whether some action should be taken relative to a given user. The chat session in the session container 340 is saved in the chat container 328. In one embodiment, the level one and level two classifiers are Bayesian filters. Bayesian filters require training to effectively classify text. The chat sessions stored as training data 325 and test data 326 in the storage 310, are used to train the classifiers. The training data comes from the chat sessions of the MUVE. The chat is broken into manually classified examples of "acceptable" or "unacceptable" messages for training the level one classifier. The level two classifier is trained using chat sessions previously reviewed by a moderator. More specifically, in one embodiment, chat messages from a session that required moderator intervention are evaluated by the level one classifier. The resulting set of messages labeled "unacceptable" by the level one classifier provide a training example. Conversely, chat messages from a chat session that was reviewed by a moderator, but where the moderator did not take action can be used to build training examples. Specifically, the chat messages from such a session may be evaluated by the level one classifier and the resulting chat messages labeled "unacceptable" provides a negative training example. The training data has both positive and negative examples, allowing the level two classifier to differentiate between a chat session that warrants moderator review and chat session that, while having some messages classified as "unacceptable", does not require moderator intervention.

Figure 4:
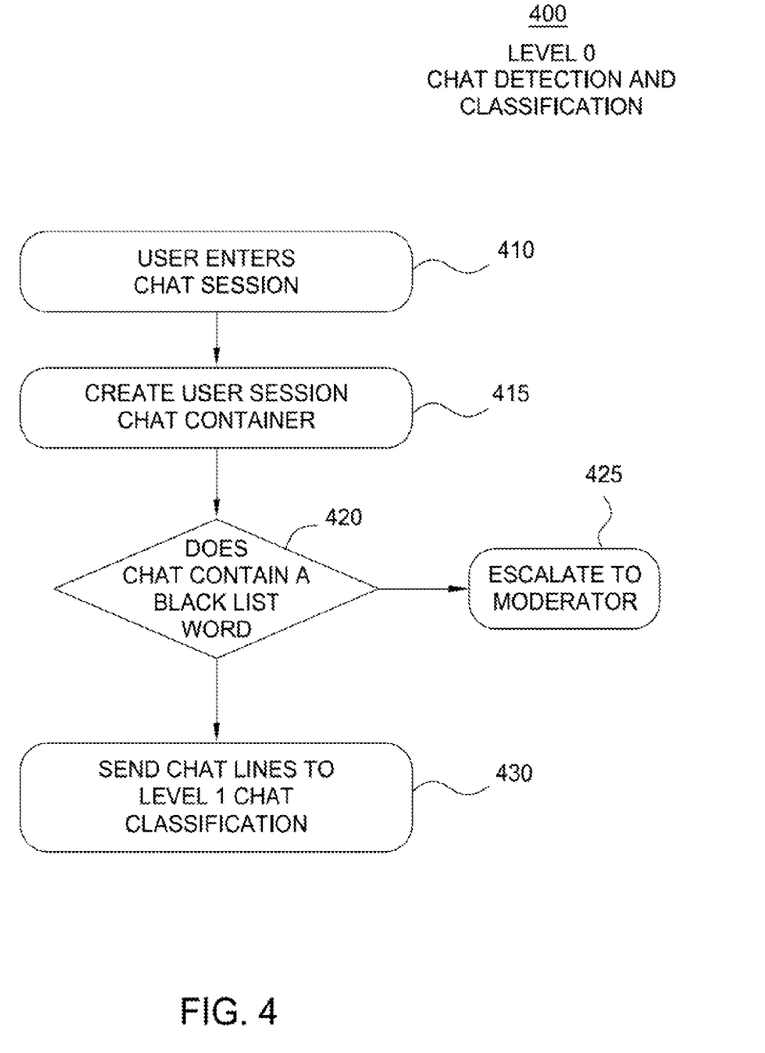
FIG. 4 is a method for level zero chat detection and classification, according to certain embodiments of the present disclosure.

FIG. 4 illustrates a method 400 for escalating unacceptable chat to a moderator, according to one embodiment of the invention. The level zero chat detection and classification represents an initial escape clause for evaluating user chat messages. That is, the level 0 chat classifier can do pattern matching for words and phrases that should always receive some attention from a moderator or other action. As shown, the method begins at step 410 where a user enters a chat session and begins communicating via a chat program with other users in a MUVE application 347. In one embodiment, chat classification engine creates a chat container (step 415) when the user enters the chat session. The chat container captures all chat session activity. The level zero classifier evaluates incoming chat as the chat container builds a history for the chat session. Chat is compared against a black list to determine if the chat message contains a black list word or phrase (step 420). If so, the chat session is escalated to the moderator for further review (step 425). The level 0 classifier provides an early escape mechanism in the chat multi-filtering process, by escalating particularly bad or unacceptable chat immediately to a moderator. Otherwise, if the chat message does not contain a word or an n-gram on the black list, the chat message is sent for further evaluation by the level one chat classifier (step 430). For example, a twenty-five word chat message is inspected to see if it includes any n-grams from the black list. Should the chat message contain an n-gram from the black list, the chat session is immediately escalated a moderator.

Figure 5:
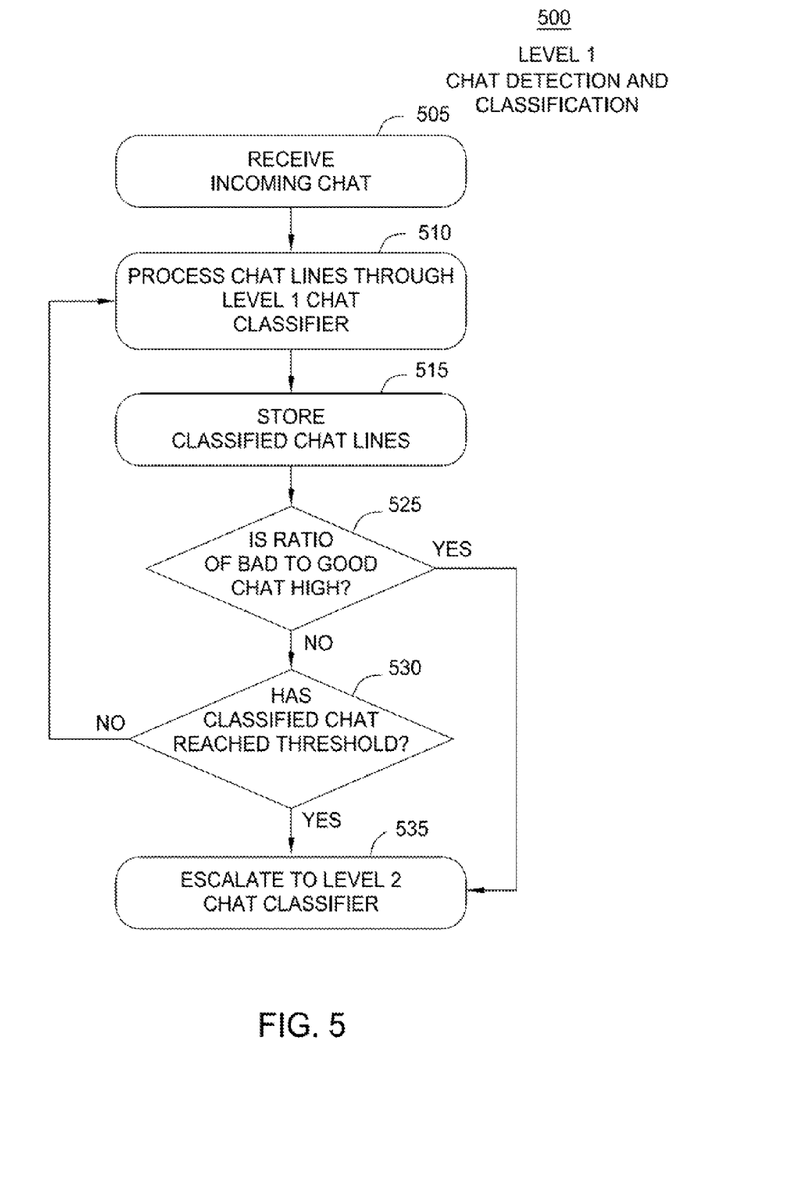
FIG. 5 is a method for level one chat detection and classification, according to certain embodiments of the present disclosure.

FIG. 5 illustrates a method 500 for classifying elements in individual chat messages, according to one embodiment of the invention. The method begins at step 505 where a level one chat classifier receives a chat message generated in a user chat session. As the user enters messages in a chat session, each chat message is run through the level one chat classifier (step 510). In one embodiment, the level one classifier makes a probabilistic determination of the likelihood of a chat message being inappropriate based on the presence of keywords or tokens. The probabilistic determination for the chat message being appropriate is stored as the classification of the chat message in the chat session (step 515). In one embodiment, the Bayesian classifier determines a chat message is "bad" or "unacceptable". For example, a level one chat classifier would assign a high probability of being "bad" chat for a chat message containing an expletive or a sexual reference and meeting a threshold for content statistically found in bad chat. Such a chat message would be classified as "unacceptable".

The chat message is passed through the level one chat classifier and monitored for a trigger condition. The chat session is inspected to determine the number of chat messages classified as appropriate chat, and the number of chat messages classified as inappropriate chat. The ratio of bad to good chat is compared against a threshold value. If the value is above an acceptable level (step 525), the chat session is elevated to the level two chat classifier (step 535). For example, assume a chat container has 400 lines of chat messages classified as unacceptable and 400 chat messages classified as acceptable. In such a case, the ratio of bad to good chat messages would be equal to 1:1. A threshold value may indicate this ratio is too high. Upon such a determination, the chat classification engine escalates the user chat session to the level two classifier. In another embodiment, a threshold value may be considerably lower. In yet another embodiment, a threshold value may be dependent on the number of lines of chat. The threshold value is representative of the amount of classified chat a moderator is willing to tolerate. One of ordinary skill in the art can surmise that a ratio threshold value may be any relationship one chooses.

A single chat session may contain thousands of chat messages. In step 530, the monitoring application determines whether the total count of bad lines in a chat session exceeds a threshold value. Doing so prevents a user from burying a large number of bad chat messages in an even larger number of acceptable messages. A threshold value may indicate the quantity of inappropriate chat is too high. When the count of inappropriate chat messages exceeds a threshold value for unacceptable chat in step 530, the chat session is escalated to the level two chat classifier (step 535). Note, the process for evaluating chat illustrated by method 500 is dynamic. The chat session continues to be processed by the level one chat classifier as long as the quantity of chat messages determined to have a high probability of being "inappropriate" is below a threshold (step 510).

For example, assume a chat classification engine has a ratio threshold of 1:3 and a bad chat threshold of 200. A chat session containing 1,000 lines of chat may have 200 chat messages classified as inappropriate and 800 lines classified as appropriate. The ratio of inappropriate to appropriate 1:4 and is acceptable. However, the user has posted 200 chat messages labeled by the level one chat classifier as unacceptable. Therefore, the chat session is elevated from the level one chat classifier to the level 2 chat classifier. In another embodiment, the threshold value may be considerably lower. In another embodiment the threshold value may be much higher. In yet another embodiment, the threshold value may be dependent on the number of chat messages. One of ordinary skill in the art can see that the quantity of a bad chat threshold value may be any relationship one chooses.

Figure 6:
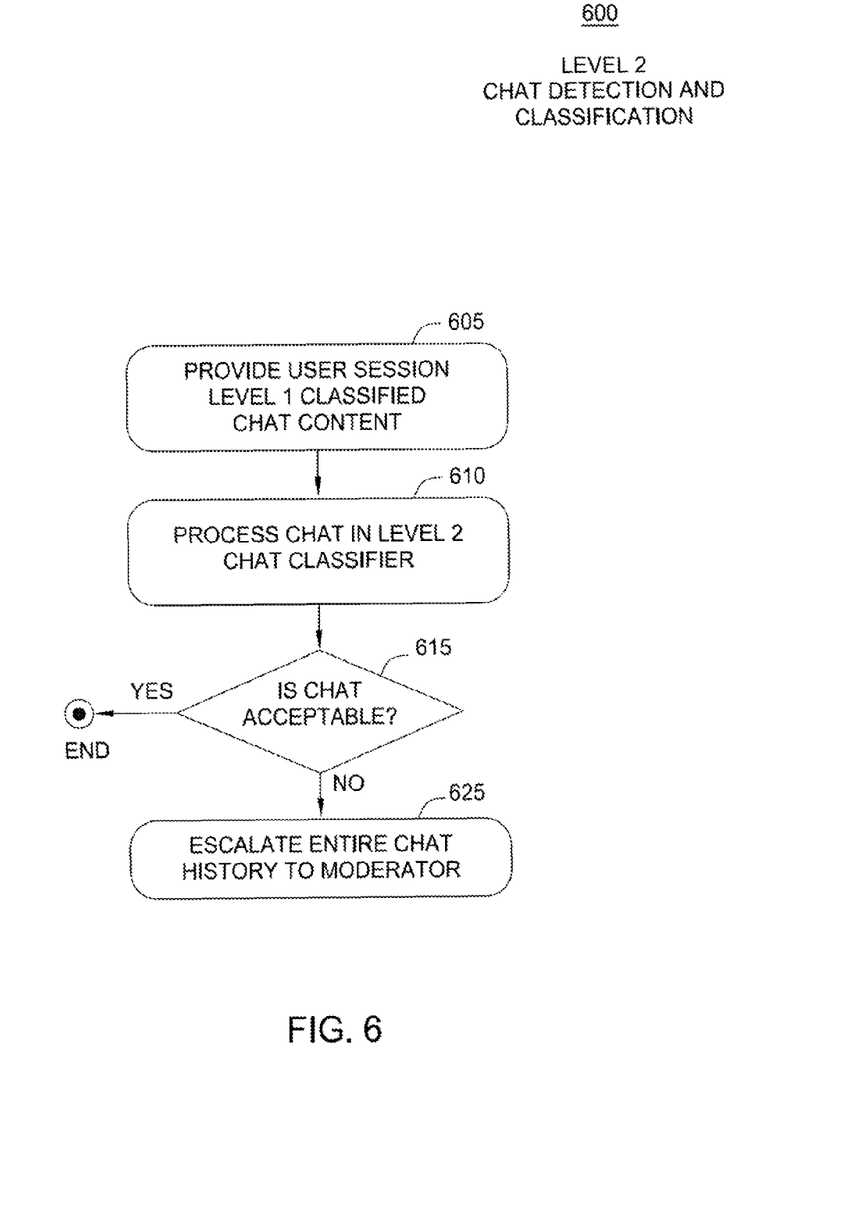
FIG. 6 is a method for level two chat detection and classification, according to certain embodiments of the present disclosure.

FIG. 6 illustrates a method 600 for classifying a chat session with a level two chat classifier, according to one embodiment of the invention. The method begins at step 605 where a level two chat classifier receives the user chat session and chat message already classified by the level one chat classifier (i.e., classification of each line as being acceptable or unacceptable"). In one embodiment, the level two classifier evaluates chat messages classified as unacceptable by the level one classifier. That is, unlike the level one chat classifier which chat messages individually, the level two chat classifier evaluates a chat session. The result is a classification (or probability) that the chat session itself is one that should be reviewed by a moderator. At step 610, the level two chat classifier processes the chat session. The level two chat classifier evaluates lines of chat classified as bad by the level one classifier and makes a probabilistic determination whether the chat session as a whole is unacceptable and should be escalated to a moderator.

For example, assume the level one classifier is presented with the chat message "hello look up the dojo on the map?" The bigram "look up" and the word "Hello" may have a higher probability of being part of unacceptable chat. This can occur because the level one classifier found them in a higher percentage of time as part of bad chat as opposed to good chat. The level two chat detection classifier looks at features of the complete chat session and determines a probability of the chat session being acceptable or unacceptable. In another embodiment the level one classifier may determine the probability of good chat is high for the chat message "hello look up the dojo on the map?" The probabilities are influenced by the training of the classifiers. One of ordinary skill in the art can see the results may vary depending on the chat users and the chat community guidelines.

A probability of the chat session as being acceptable (step 615), is made from the level two classified chat. If the chat session is determined to likely be "good" or "acceptable" chat, the classification engine ends the escalation of the user session chat container. If the chat session has a high probability of being "bad" or "unacceptable", the chat session is escalated to the moderator (step 625).

As noted above, the level one classifier evaluates individual chat messages as being "acceptable" or "unacceptable" and the level two classifier evaluates a chat session (i.e., a collection of chat messages labeled as "unacceptable") to determine whether that chat session should be reviewed by a moderator. In addition, each classifier may be trained using a corresponding set of training data. For the level one classifier, the training data may include a collection of chat messages manually tagged as being "acceptable" or "unacceptable." For example, chat messages sent between users that have been reviewed by a moderator may be used to build a set of training data. Similarly, training data for the level two classifier can come from chat sessions reviewed by moderators. For example, a chat session where a moderator determined intervention was necessary may provide training data for the level two classifier. In one embodiment, such a chat session may be evaluated by the level one classifier and individual chat messages labeled as unacceptable by the level one classifier form a training example for the level two classifier.

Figure 7:
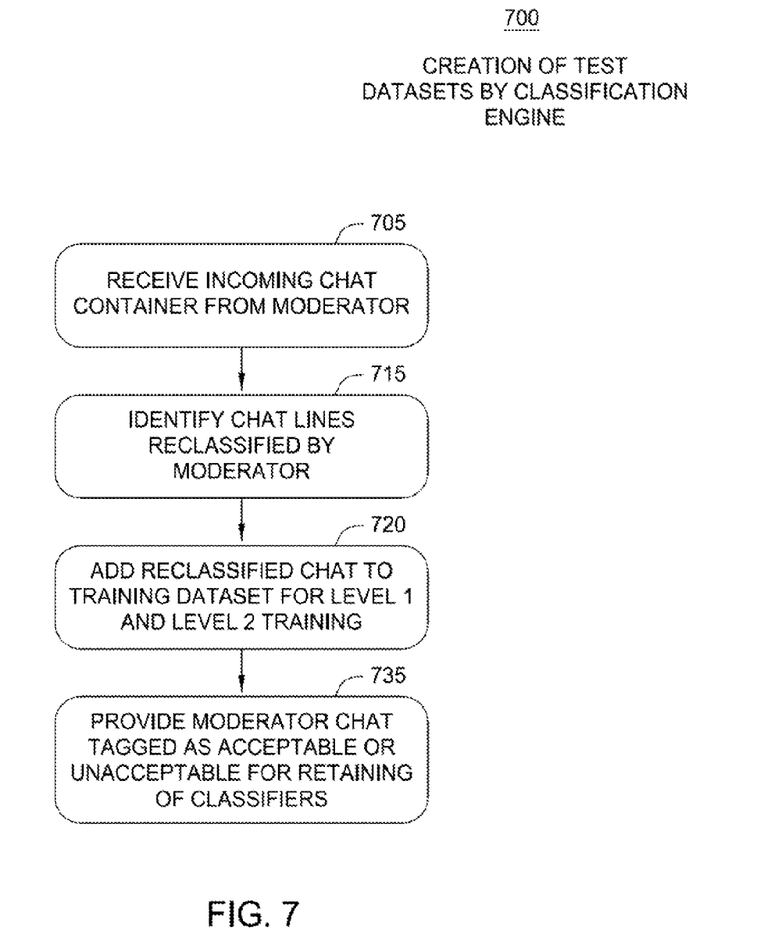
FIG. 7 is a method for providing updates to training data for the classifiers, according to certain embodiments of the present disclosure.

FIG. 7 illustrates a method 700 for creating a training dataset, according to one embodiment. The classification engine receives a chat container acted on by the moderator (step 710). After reviewing a chat session, a moderator may reclassify some of the chat messages labeled as being "acceptable" or "unacceptable" by the level one classifier. The moderator may also evaluate the entire chat session as one that requires (or does not require) some measure of moderator intervention. Once so classified, that message may be used to create additional training examples. The classification engine identifies the chat messages reclassified by the moderator (step 715). Messages reclassified by the moderator may be added to an existing training dataset used to train the level one classifier (e.g., the original set of messages manually classified as "acceptable" or "unacceptable" by the moderator). The training dataset is used to retrain the level one classifier (step 720). Further, a chat session escalated to a moderator by the level two classifier may be used to create an additional training example for the level two classifier (step 720). For example, if a moderator takes some action after reviewing an escalated chat session, that session may be used to create an additional positive training example. Conversely, a chat session escalated to the moderator by the level two classifier, but where no intervention occurs, may be used to create an additional negative training example. In both cases, a training example is created from messages classified by the level one classifier as "unacceptable." The training examples are added to the training dataset by the classification engine and provided to the storage device (step 735).

Figure 8:
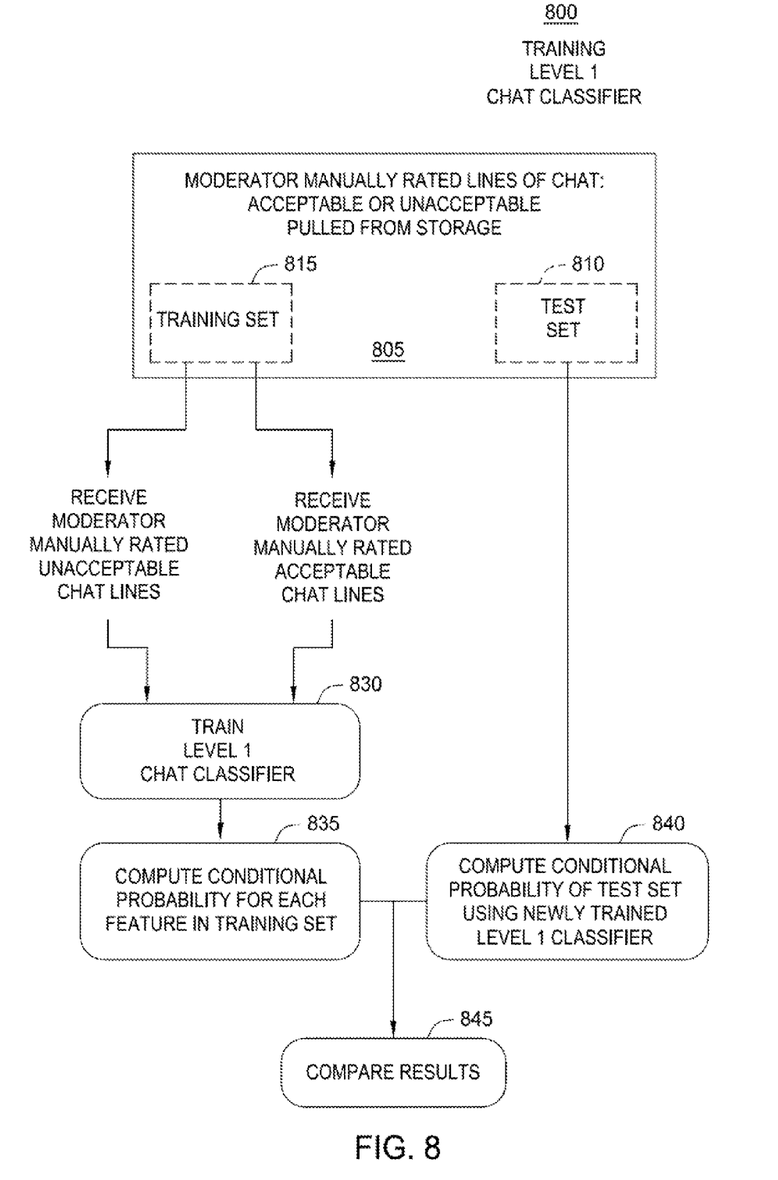
FIG. 8 is a method for training a level one chat classifier, according to certain embodiments of the present disclosure.

FIG. 8 illustrates a method 800 for training a level one chat classifier, according to one embodiment of the invention. The chat classification engine is provided with the training examples, i.e., chat messages labeled as "acceptable" or "unacceptable" (step 805). Some chat messages are used for testing the level one classifier once it has been trained. The testing dataset includes messages manually classified as being "acceptable" or "unacceptable" by the moderator. Once trained, the level one classifier may evaluate the testing dataset to determine how accurately it classifies the chat messages in the testing dataset. The training dataset includes one set of chat messages classified as unacceptable by the moderator and a second set of chat messages classified as acceptable by the moderator (step 815).

The level one chat classifier evaluates features of the positive and negative training examples to create a statistical model used to determine whether an unclassified message is "acceptable or 'unacceptable" (step 830) That is, the training dataset allows the classifier to determine statistical probabilities for certain elements of a chat message as acceptable, or as unacceptable (step 835). For example, the phrase "my banana" may have a statistical probability of occurring 60% of the time in unacceptable chat messages and, in turn, 40% in acceptable chat messages. Therefore it is statistically 60% more likely that when the classifier comes across the phrase "my banana" it is being used in a message that a moderator would classify as unacceptable. Likewise, use of unusual uppercasing such as gRAPE and odd spelling where 3 is used instead of an E or 5 is used instead of an S typically have a higher statistical probability of being in unacceptable chat and is classified accordingly. However, gRAPE may occur from when a user has the caps lock on and the use of numbers may have acceptable meanings.

A chat classifier may be checked for correctness by running test data through chat classifier which was not used in the training of the classifier. Training on the same dataset can potentially make the classifier overfitting. Overfitting occurs when a classifier begins to memorize training data rather than learning to generalize from a trend. A classifier which has been overfit will generally have poor predictive performance. That is, the classifier tries to classify outliners instead of correctly assuming they are without predictive value. The classifier is therefore tested against a portion of the dataset that was not used to train the classifier. The newly trained level one classifier uses the test dataset to compute the percentage of chat messages in the test set which have a high probability of being inappropriate (step 840). The computed results for the test dataset are compared against those of the training dataset (step 845). The results indicate how well the trained classifier can predict whether a chat message should be labeled as "acceptable" or as "unacceptable".

Figure 9:
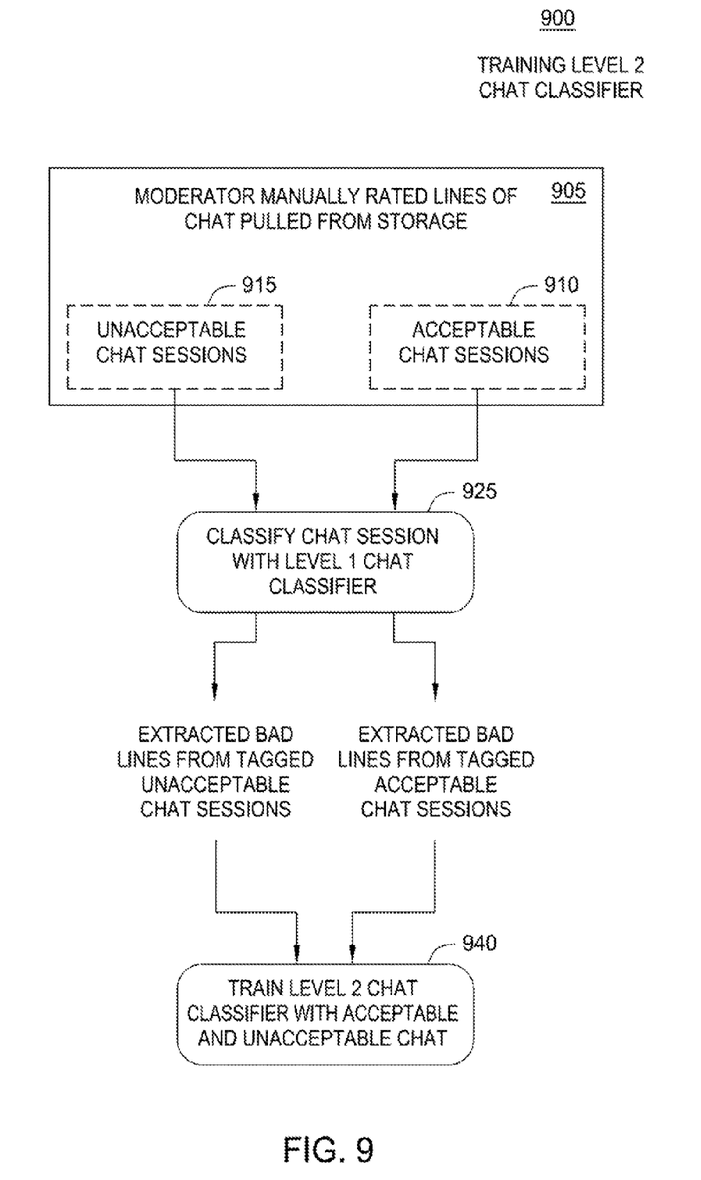
FIG. 9 is a method for training a level two chat classifier, according to certain embodiments of the present disclosure.

FIG. 9 illustrates a method 900 for training a level two chat classifier, according to one embodiment. As shown, the method 900, begins at step 905 where the chat classification engine extracts chat sessions from the training dataset. As noted, the training dataset may include chat sessions classified as acceptable chat sessions 910 or unacceptable chat sessions 915. For example, as noted above, training examples may be created by evaluating chat sessions that were been reviewed by a moderator. In such a case, positive training examples generally correspond to chat sessions where a moderator took some action after reviewing a chat session and chat sessions reviewed by a moderator, but did not result in any action, provide negative examples. In both cases, chat messages in these sessions classified as "unacceptable" by the level one classifier provide the training examples. Further, after an initial training set has been constructed from historical chat sessions, additional training examples may be created when the trained level two classifier indicates a given chat session should be escalated to a moderator for review. Depending on whether the moderator takes action after reviewing such a chat session, an additional positive or negative training example may be created.

The acceptable chat sessions 910 and unacceptable chat sessions 915 are evaluated by the level one chat classifier (step 925). The level one chat classifier labels chat messages in the acceptable chat sessions 910 and unacceptable chat sessions 915 as being acceptable or unacceptable. The dataset of unacceptable messages from the chat sessions which did result in moderator intervention (chat sessions 915) and the unacceptable messages from chat sessions reviewed by a moderator, but for which no intervention is required (chat sessions 910) provide the level two training datasets.

The level two classifier is then trained with the "unacceptable" messages from these chat sessions. The two datasets provide a statistical probability of chat sessions being acceptable based on chat encountered in the past. That is, the bad but acceptable dataset teaches the level two classifier the chat sessions which may contain some elements of bad chat but are still statistically likely to be considered acceptable by a moderator (or at least not result in any moderator intervention after review). The bad but unacceptable dataset teaches the level two classifier those datasets that are statistically likely to be unacceptable and should be elevated to the moderator for further review.

Figure 10:
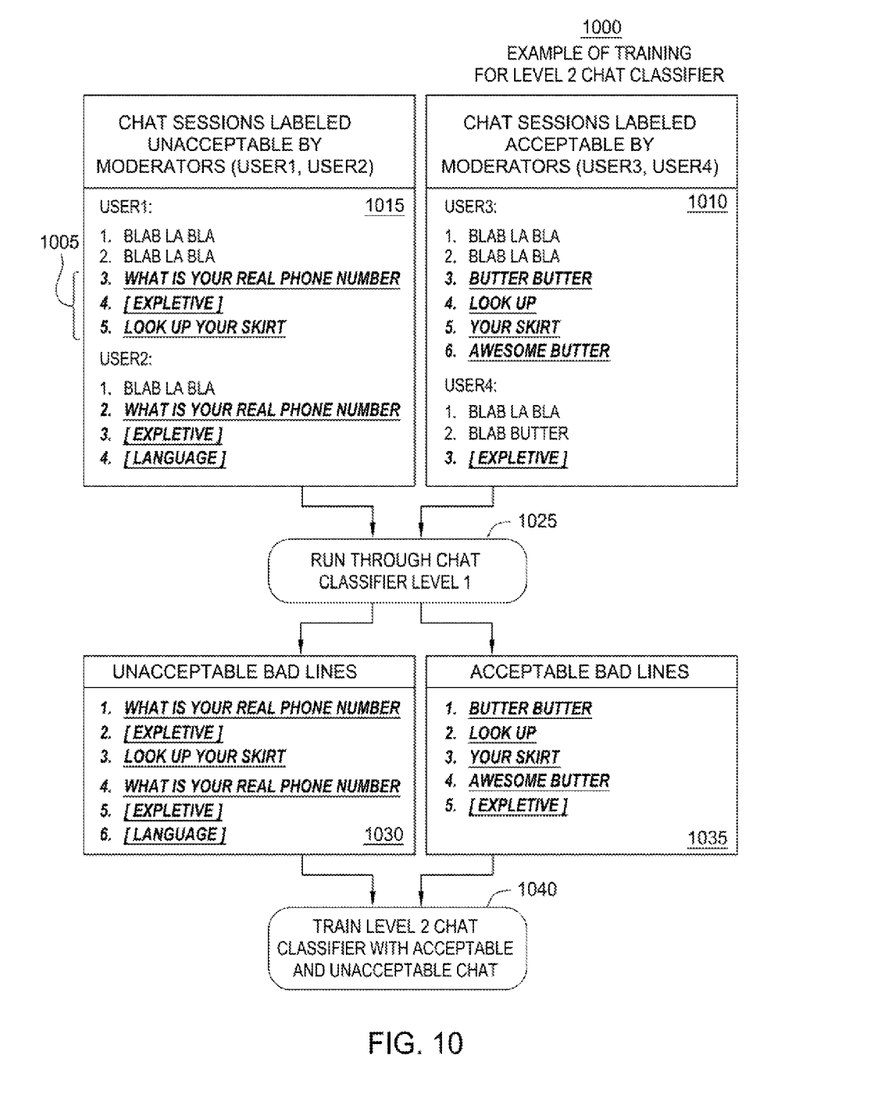
FIG. 10 illustrates an example of training a level two chat classifier, according to certain embodiments of the present disclosure.

FIG. 10 illustrates an example for the training of a level two classifier 1000, according to one embodiment of the invention. As shown, training dataset 1005 illustrates an example of chat sessions labeled unacceptable by the moderator 1015. For example, User1 has chatted 5 lines. Of the five lines, three of the lines are shown as unacceptable by the level one classifier. Specifically, lines 3, 4, and 5 have been labeled by the level one classifier as "unacceptable". The moderator reviewed the chat session of User1 labeled the session as unacceptable. The chat session for User2 is also tagged as unacceptable by the moderator. User2 chat session contains 4 lines of which line 2, 3, and 4 are shown as unacceptable Training dataset 1005 also demonstrates chat sessions labeled acceptable by the moderator 1010. For example, User3 has chatted 6 lines. Four of the six lines are shown as inappropriate by the chat classification engine. The moderator has nonetheless tagged the chat session as acceptable. User4 has chatted 3 lines with one of them shown as inappropriate by the chat classification engine. User4 chat session was also determined to be acceptable by the moderator.

The chat sessions labeled as unacceptable by the moderator and the chat sessions labeled as acceptable by the moderator are each run through the level one classifier. The level one classifier determines the statistically inappropriate, or bad, lines from the dataset of acceptable chat sessions and the dataset of unacceptable chat sessions. That is, a classification of inappropriate messages is determined for the unacceptable chat sessions dataset 1030. And the classification of inappropriate messages is determined for the acceptable chat session dataset 1035. The datasets represent a probability that those chat messages will result in a certain type of chat. As shown, [Expletive] is found in both datasets.

The datasets are used to train the level two classifier with both acceptable and unacceptable chat (step 1040). The classifier assigns a probability based on how often a particular item is found in unacceptable chat versus how often that particular item is found in acceptable chat. For example, [Expletive] is found in both the unacceptable dataset 1030 and the acceptable dataset 1035. The classifier is then capable of providing a statistical probability that [Expletive] will result in unacceptable chat. In this example, the classifier would determine that a chat message containing [Expletive] would likely occur 67% of the time in unacceptable chat. In another embodiment, [Expletive] may only occur 10% of the time in unacceptable chat. The level two classifier evaluates "unacceptable" messages from chat sessions (which meet certain triggering criteria, as described above) to determine whether a chat session should be elevated to the moderator.

Advantageously, embodiments provide an application for reducing the amount of chat elevated to the moderator. The multilayered chat detection and classification determines the amount of bad but acceptable chat not requiring moderator intervention. The chat classification engine is able to distinguish between benign uses to certain terms or phrases and other more nefarious uses of those same terms or phrases. The chat classification engine processes the chat session through an escalation of a multiple of classifier levels to arrive at this determination. Thus reducing a large amount of chat burdening the moderators and saving time and money. The retraining of the classifiers ensures the chat deemed site appropriate is properly characterized, reducing the amount of bad but acceptable chat which would otherwise be elevated to the moderator.

While the foregoing is directed to embodiments of the present invention, other and further embodiments of the invention may be devised without departing from the basic scope thereof, and the scope thereof is determined by the claims that follow.

What is claimed is:

1. A computer-implemented method for monitoring users interacting in an online multiuser environment, the method comprising:
    training a first classifier with a plurality of messages labeled as either acceptable or unacceptable;
    training the second classifier with a plurality of training example sessions, wherein each training example is generated from a session labeled as being either appropriate for escalation or inappropriate for escalation, and wherein each training example session includes messages from that session classified as unacceptable by the first classifier;
    for each message sent by a first user during a session:
        determining, via the first classifier, whether to label the message as being either acceptable or unacceptable for the online multiuser environment; and
        upon satisfying a triggering condition for the session of the user, determining, via the second classifier, whether to escalate the session to a moderator for review.

2. The method of claim 1, wherein the first classifier is a Bayesian Filter.

3. The method of claim 1, wherein the second classifier is a Bayesian filter.

4. The method of claim 1, wherein the triggering condition is a ratio of messages in the session classified as unacceptable and acceptable.

5. The method of claim 1, wherein the triggering condition is a maximum number of messages in the session classified as unacceptable.

6. The method of claim 1, wherein the second classifier determines whether to escalate the session to a moderator for review by evaluating messages in the session classified as unacceptable by the first classifier.

7. A non-transitory computer-readable storage medium comprising a program product which, when executed, is configured to perform an operation for monitoring users interacting in an online multiuser environment, the operation comprising:
    training a first classifier with a plurality of messages labeled as either acceptable or unacceptable;
    training the second classifier with a plurality of training example sessions, wherein each training example is generated from a session labeled as being either appropriate for escalation or inappropriate for escalation, and wherein each training example session includes messages from that session classified as unacceptable by the first classifier;
    for each message sent by a first user during a session:
        determining, via the first classifier, whether to label the message as being either acceptable or unacceptable for the online multiuser environment; and
        upon satisfying a triggering condition for the session of the user, determining, via the second classifier, whether to escalate the session to a moderator for review.

8. The computer-readable storage medium of claim 7, wherein the first classifier is a Bayesian Filter.

9. The computer-readable storage medium of claim 7, wherein the second classifier is a Bayesian filter.

10. The computer-readable storage medium 7, wherein the triggering condition is a ratio of messages in the session classified as unacceptable and acceptable.

11. The computer-readable storage medium 7, wherein the triggering condition is a maximum number of messages in the session classified as unacceptable.

12. The computer-readable storage medium 7, wherein the second classifier determines whether to escalate the session to a moderator for review by evaluating messages in the session classified as unacceptable by the first classifier.

13. A system, comprising:
   a memory storing an application program; and
   a processor which, when executing the application program is configured to perform an operation for monitoring users interacting in an online multiuser environment, the operation comprising:
      training a first classifier with a plurality of messages labeled as either acceptable or unacceptable,
      training the second classifier with a plurality of training example sessions, wherein each training example is generated from a session labeled as being either appropriate for escalation or inappropriate for escalation, and wherein each training example session includes messages from that session classified as unacceptable by the first classifier,
      for each message sent by a first user during a session:
         determining, via the first classifier, whether to label the message as being either acceptable or unacceptable for the online multiuser environment, and
         upon satisfying a triggering condition for the session of the user, determining, via the second classifier, whether to escalate the session to a moderator for review.

14. The system of claim 13, wherein the first classifier is a Bayesian Filter.

15. The system of claim 13, wherein the second classifier is a Bayesian filter.

16. The system of claim 13, wherein the triggering condition is a ratio of messages in the session classified as unacceptable and acceptable.

17. The system of claim 13, wherein the triggering condition is a maximum number of messages in the session classified as unacceptable.

18. The system of claim 13, wherein the second classifier determines whether to escalate the session to a moderator for review by evaluating messages in the session classified as unacceptable by the first classifier.

* * * * *